Oct. 23, 1928.
J. J. KILLIP
SUN SHADE FOR AUTOMOBILE WINDOWS
Filed July 6, 1927
1,688,719
2 Sheets-Sheet 1
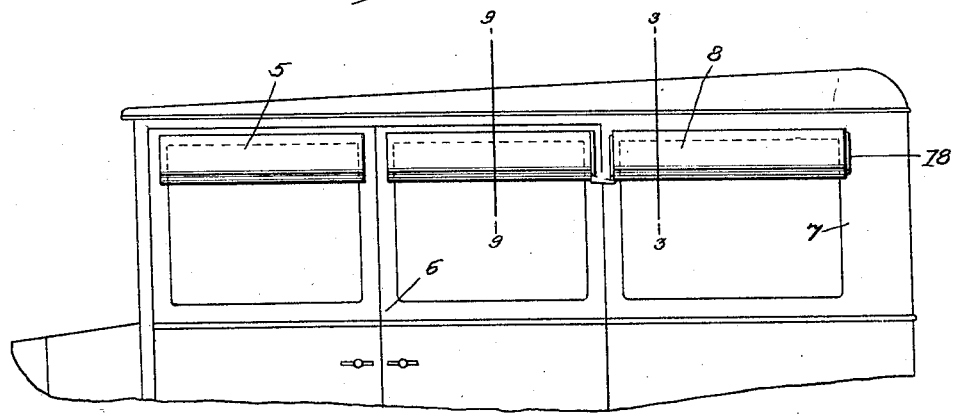
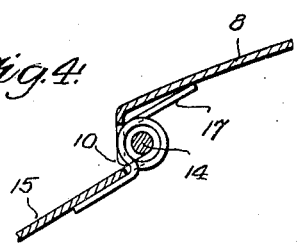
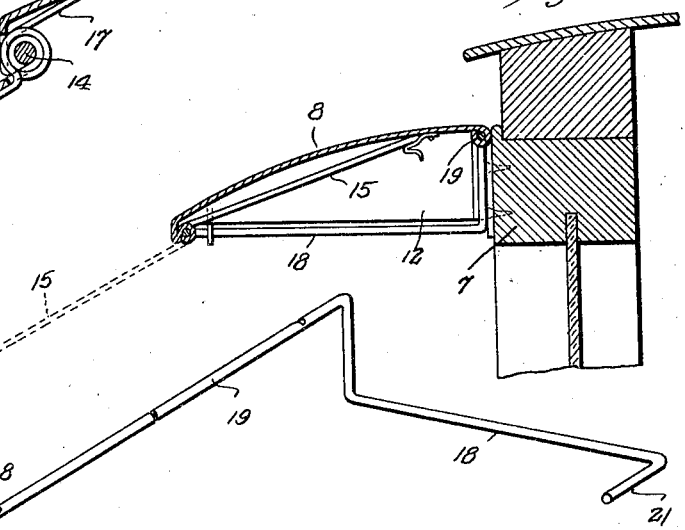
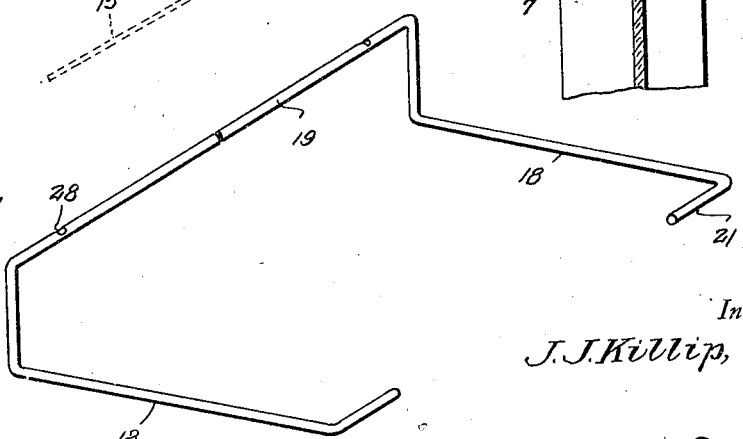
Inventor
J. J. Killip,
By Clarence A. O'Brien
Attorney Oct. 23, 1928. 1,688,719
J. J. KILLIP
SUN SHADE FOR AUTOMOBILE WINDOWS
Filed July 6, 1927 2 Sheets-Sheet 2
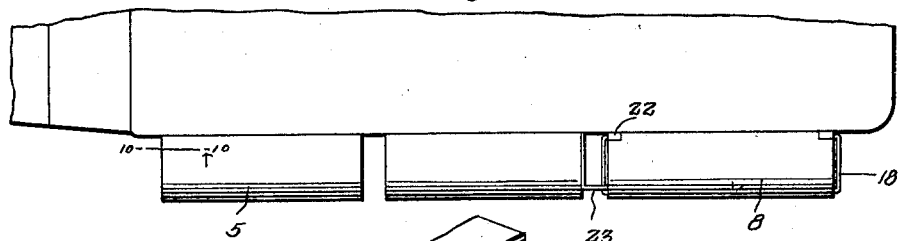
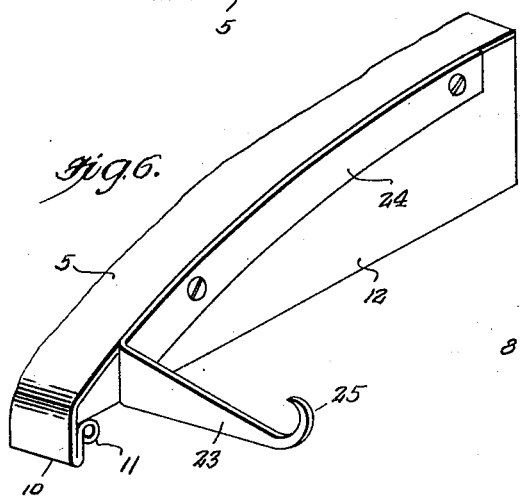
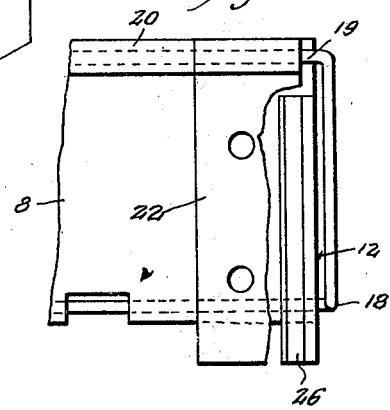
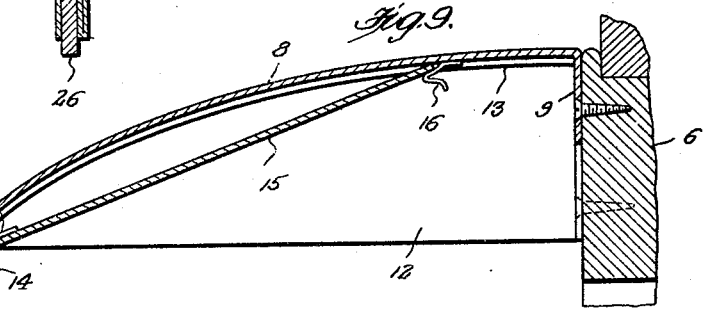
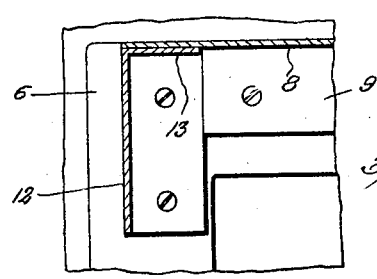
Inventor
J. J. Killip,
By Clarence A. O'Brien
Attorney Patented Oct. 23, 1928.

1,688,719

UNITED STATES PATENT OFFICE.

JOHN J. KILLIP, OF ASTORIA, OREGON.

SUNSHADE FOR AUTOMOBILE WINDOWS.

Application filed July 6, 1927. Serial No. 203,787.

My invention relates to sun shades for windows of automobiles of the closed type, and has for its principal object to provide a device of this character including a rigidly formed section adapted to be fixedly secured adjacent each side and rear side window of the automobile and immediately above the same and having a movable section hingedly connected to the outer edge thereof and adapted to be swung downwardly and outwardly with respect thereto in order to increase the area of the shade when conditions so require.

Another object is to provide means carried by one of the shades engageable with an adjacent shade and operated by the opening of the automobile doors whereby one of said shades will be moved upwardly out of alinement with said other shades so as to prevent any interference with the free opening of the door.

A still further object is to provide means for retaining the movable shade in a locked position under the stationary shade when said movable shade is not in use, and also providing said movable shade with yieldable retaining means for securing the same in position for use for shading purposes.

A still further object is to provide a sun shade of this character which is strong and durable in construction, neat and attractive in appearance, efficient and reliable in performance and relatively inexpensive to manufacture and install in position upon the automobile.

Other objects and advantages of the invention will become apparent from the following description taken in connection with the drawings.

In the drawings wherein like reference characters indicate corresponding parts:

Figure 1 is a side elevational view of the upper section of an automobile showing my invention in operative position thereon.

Figure 2 is a top plan view thereof.

Figure 3 is a vertical sectional view taken substantially along a line 3—3 of Figure 1, and showing by means of the dotted lines the movable shade panel in position when in use.

Figure 4 is a vertical sectional view through the hinged connection for the panel showing the spring provided for maintaining the same in position when in use.

Figure 5 is a perspective view of the frame for the rear side window adapted for moving the shade upwardly to permit the opening of the door.

Figure 6 is a similar view of the cam carried by the door shade for operating the rear side window shade.

Figure 7 is a bottom plan view of one end of the rear shade showing the bumper formed thereon.

Figure 8 is a sectional view through the bumper.

Figure 9 is a vertical sectional view through one of the forwardly mounted shades taken along a line 9—9 of Figure 1, and Figure 10 is a sectional view taken along a line 10—10 of Figure 2.

Referring now to the accompanying drawings I have disclosed my invention adapted for use upon the side windows and doors of an automobile of the closed type, in Figure 1 of the drawing my invention being indicated generally at 5 fixedly secured along the upper edge of the doors 6 and rear window frame 7.

The construction of the window shade adapted for use upon the doors of the car as shown in Figure 9 of the drawing comprises an upper section 8 having a downwardly extending flange 9 formed at its rear edge providing means for rigidly securing the same to the upper edge of the door. The upper section 8 curves slightly downwardly in a forward direction with its forward edge disposed in a substantially vertical position as indicated at 10 in the form of a lip and turned inwardly and upwardly to provide a plurality of spaced apart hinge sections 11, said sections being arranged slightly under the forward edge of the top section 8 of the sun shade.

At each side of the top section 8 are provided vertically extending aprons 12 having the lower edge thereof arranged on a horizontal plane slightly above the hinged members 11. As shown in Figure 10 of the drawing, the aprons 12 are separately formed from the upper section 8 of the sunshade, the aprons being provided at their upper edges with inwardly extending flanges 13 upon which to support the section 8.

A pivot pin 14 extends through the hinge members 11 longitudinally along the front edge of the section 8 of the sun shade and upon which pin is swingingly mounted a panel 15 at one edge, with its opposite edge adapted to extend upwardly and under the top section 8 and retained in position with respect thereto by a snap fastener 16. A spring 17 is mounted on the pivot pin 14 having its ends pressing respectively against the top section 8 and panel 15 whereby to normally force the same away from each other.

Thus upon release of the panel from the fastener 16 the spring 17 operates to swing the panel downwardly and outwardly as shown in Figure 4 of the drawing until the panel abuts the lower edge of the lip 10, the lip 10 thus operating to limit the extent of outward swinging movement of the panel. As will be seen from Figures 3 and 4 of the drawing the design of the lip 10 permits the panel 15 to be swung outwardly at an angle of approximately forty-five degrees, but the extent of such swinging movement may be regulated by the extent to which the lip extends downwardly, thus the movement of the panel 15 may be limited to a substantially vertical position by the proper formation of said lip.

A slightly different construction for the shade provided on the rear window of the automobile is necessary in order that the same may be moved upwardly out of position in order to permit the opening of the door of the car adjacent thereto. Such change of construction comprises the provision of an annular frame 18 including a rod 19 arranged along its rear edge and adapted to be inserted longitudinally in the tubular edge 20 formed at the rear of the section 8. The side portion of the frame 18 extends immediately beneath the lower edge of the apron 12 with the front section 21 arranged parallel with the rod 19 and inserted in the hinge sections 11 partly under the front edge of the section 8. A hinge plate 12 having a bore for supporting the rod 19 is secured to the upper edge of the rear window frame 7, thus permitting the entire shade to be moved upwardly. A cam 23 is arranged to extend outwardly from the adjacent side of the shade carried on the door 6 and secured to the outer side of the apron 12 of said shade by an angularly extending plate 24 and provided with a hook 25 at its outer end engaging the side of the frame 18. The edge of the cam 23 is inclined upwardly from the hook so that as the cam is slid under the frame 18 the rear shade will be moved upwardly, thus permitting the shade mounted on the door to ride under the same. At the inner edge of the apron 12 provided on the rear movable shade is arranged a rubber bumper 26 carried in a bracket 27 formed on said apron and forming a shock absorbing means for the shade as the same is lowered by the sudden closing of the door. The arrangement of this bumper is clearly illustrated in Figures 7 and 8 of the drawing.

In order to prevent the frame 18 from sliding out of engagement with the shade, I provide a plurality of notches 28 in the rod 19 within which a section of the tubular rear edge of the upper section 8 may be pressed so as to secure the parts in position.

The upper section 8 of the shade ordinarily affords sufficient protection to the occupants of the car during the middle of the day, but at times when the sun is lower on the horizon the use of additional shade means is necessary and in such cases the panel 15 may be lowered to afford such additional protection.

It is obvious that I have shown the preferred embodiment of my invention, but it is to understood that various changes in the size, shape and arrangement of parts may be resorted to, without departing from the spirit of the invention or the scope of the appended claims.

Having thus described the invention, what I claim as new and desire to secure by Letters Patent is:—

1. In a shade for automobile windows comprising a rigid shade section secured along the upper edge of the window, vertically disposed aprons attached at one end above the window for supporting each end of the shade, said rigid section and said aprons extending laterally from the window, a vertically disposed lip formed at the outer edge of said rigid section with a series of tubular end sections formed inwardly thereof, a shade panel having a series of hinge sections formed at one edge complementary with said tubular hinge section, a connecting hinge rod for said hinge section, said lip constituting a stop whereby to limit the outward movement of the panel, yieldable means engaging the shade section and the panel whereby to normally force the latter downwardly, and a snap fastener carried by the rigid section engageable with the free edge of said panel for releasably securing the same in raised position.

2. In a shade for the doors and windows of an automobile, comprising a door shade secured at one edge to the upper frame of the door and extending laterally therefrom, a window shade hingedly connected at the upper edge of a window frame, and means carried by one of said shades engageable with other shade for raising said window shade above said door shade by the opening of the door.

3. In a shade for the doors and windows of an automobile comprising a door shade having a rigid shade section fixedly secured to the upper frame of the door and extending laterally therefrom, vertically arranged aprons at each end of the shade, a shade panel hingedly connected at one edge to the outer edge of said shade section, a spring engaging said shade section and said panel adapted to normally force the latter downwardly, a snap fastener carried by said shade section releasably engaging the opposite end of said panel for securing the same in raised position, a cam extending outwardly from one of the aprons of said door shade and having a hook formed at its outer end thereof, and a window shade hingedly secured to the upper edge of the window frame and extending laterally therefrom, and having side aprons and a hinge panel similar to said door shade and an angular frame including a pair of parallel rods carried at the front and rear edges of the shade and a side section engageable by the hook on said cam and adapted to slide upon the cam whereby to raise said window shade into a position above said door shade upon the opening of the door.

In testimnoy whereof I affix my signature.

JOHN J. KILLIP.